US012040575B2

(12) United States Patent
Buck et al.

(10) Patent No.: US 12,040,575 B2
(45) Date of Patent: Jul. 16, 2024

(54) PLUG CONNECTOR AND CONNECTOR SET WITH A LEVER EXTENSION

(71) Applicant: TE Connectivity Germany GmbH, Bensheim (DE)

(72) Inventors: Carsten Buck, Bensheim (DE); Michael Schall, Bensheim (DE)

(73) Assignee: TE Connectivity Germany GmbH, Bensheim (DE)

(*) Notice: Subject to any disclaimer, the term of this patent is extended or adjusted under 35 U.S.C. 154(b) by 140 days.

(21) Appl. No.: 17/746,415

(22) Filed: May 17, 2022

(65) Prior Publication Data

US 2022/0376435 A1 Nov. 24, 2022

(30) Foreign Application Priority Data

May 18, 2021 (DE) ......................... 102021112898.6

(51) Int. Cl.
*H01R 13/62* (2006.01)
*H01R 13/629* (2006.01)

(52) U.S. Cl.
CPC . *H01R 13/62955* (2013.01); *H01R 13/62961* (2013.01)

(58) Field of Classification Search
CPC ........ H01R 13/62955; H01R 13/62961; H01R 13/6295
See application file for complete search history.

(56) References Cited

U.S. PATENT DOCUMENTS 5,829,994 A 11/1998 Oda et al.
6,793,522 B2 9/2004 Yamashita
10,374,356 B2 8/2019 Amerio et al.
2003/0190836 A1 10/2003 Yamashita
2018/0342834 A1 11/2018 Amerio et al.

FOREIGN PATENT DOCUMENTS

DE 19702836 A1 7/1997
DE 10308636 A1 10/2003
FR 3084532 A1 1/2020
JP H07220805 A 8/1995
JP H9204956 A 8/1997
JP 2010146950 A 7/2010
JP 5375076 B2 10/2013
WO 2007044393 A2 4/2007
(Continued)

OTHER PUBLICATIONS

German Office Action, Application No. 102021112898.6, Dated: Dec. 23, 2021, 5 pages.
(Continued)

*Primary Examiner* — Ross N Gushi
(74) *Attorney, Agent, or Firm* — Barley Snyder

(57) ABSTRACT

A plug connector pluggable together with a counter connector includes a connector housing having a guiding member and a lever device. The lever device has a lever transferrable from a plug position to a securing position, a coupling that is movable by the lever to engage the counter connector, and a lever extension attached to the lever and extendable and/or retractable with respect to the lever. A swivel movement of the lever out of the securing position is blocked by the lever extension retracted with respect to the lever. The guiding member blocks a shifting of the lever extension if the lever is moved out of the plug position and is not in the securing position.

17 Claims, 7 Drawing Sheets

(56) References Cited

FOREIGN PATENT DOCUMENTS

| | | | |
|---|---|---|---|
| WO | 2012007343 | A1 | 1/2012 |
| WO | 2015113972 | A1 | 8/2015 |
| WO | 2019129453 | A1 | 7/2019 |

OTHER PUBLICATIONS

Office Action from Japan's Patent Office dated Apr. 25, 2023 with English translation thereof, corresponding to Application No. 2022-079194, 9 pages.
Examination Report from the Intellectual Property Office (India) dated Dec. 1, 2022 corresponding to Application No. 202244027350, 6 pages.
Extended European Search Report dated Oct. 10, 2022 corresponding to Application No. 22173953.5-1201, 36 pages.
Korean Office Action dated Dec. 21, 2023, corresponding to Application No. 10-2022-0059583, 7 pages.

PLUG CONNECTOR AND CONNECTOR SET WITH A LEVER EXTENSION

CROSS-REFERENCE TO RELATED APPLICATIONS

This application claims the benefit of the filing date under 35 U.S.C. § 119(a)-(d) of German Patent Application No. 102021112898.6, filed on May 18, 2021.

FIELD OF THE INVENTION

The present invention relates to a plug connector for plugging together with a counter connector, and to a connector set.

BACKGROUND

Plug connectors and connector sets are known from prior art, and different demands are made on them. For example, these plug connectors (the same applies to the connector sets which are not always explicitly mentioned hereinafter) receive a number of plug contacts, whereby the forces to be spent for plugging together the plug connector and the counter connector increase with the number of plug contacts.

To overcome the plug forces, the plug connectors and connector sets can include a lever. The force required for plugging together can thus be applied by the user via the lever. However, the lever can increase the size of the plug connector.

In FIGS. 1 and 2, a connector set 1 from prior art is shown, the connector set 1 comprising a plug connector 3 and a counter connector 5. At the plug connector 3, a lever 7 is held at a connector housing 11 of the plug connector 3 to be rotating about an axis of rotation 9. The lever 7 has a U-shaped design and includes two lever arms 7*a* which partially grip around the connector housing 11. The lever 7 is integrally formed in the shown embodiment and can also be referred to as lever device 13.

At the lever 7, a coupling 15 is furthermore provided near the axis of rotation 9 which can engage with corresponding elements of the counter connector 5 and thus permit a facilitated plugging together of the plug connector 3 with the counter connector 5.

To permit a required plug force F acting from the plug connector 3 via the coupling 15 to the counter connector 5, the lever 7 has a lever length L. The lever length L is measured from one end 17 of the lever 7 to the axis of rotation 9. The lever length L corresponds to the length of a lever arm as it is used for the calculation by the lever principle.

As can be seen when comparing FIG. 1 and FIG. 2, upon the actuation of the lever 7 from the plug position 23 to the securing position 25 with a swivel movement 27, which is represented symbolically, the plug connector 3 and counter connector 5 are plugged into each other since the coupling 15 grips behind a non-depicted coupling element of the counter connector 5 during the swivel movement 27, and the plug connector 3 and the counter connector 5 are mutually moved towards each other. The axis of rotation 9 of the plug connector 3 moves towards the counter connector 5 in the process, where the exact path the axis of rotation 9 follows is irrelevant.

The required lever length L of plug connectors 3 from prior art, however, can lead to a number of disadvantages. The lever 7 can, for example, collide in the region of feed cables 19 with them and aggravate handling. Furthermore, the required lever length L leads to a projection 21*a* beyond the connector housing 11 which enlarges the required installation volume of the shown connector set 1.

SUMMARY

A plug connector pluggable together with a counter connector includes a connector housing having a guiding member and a lever device. The lever device has a lever transferrable from a plug position to a securing position, a coupling that is movable by the lever to engage the counter connector, and a lever extension attached to the lever and extendable and/or retractable with respect to the lever. A swivel movement of the lever out of the securing position is blocked by the lever extension retracted with respect to the lever. The guiding member blocks a shifting of the lever extension if the lever is moved out of the plug position and is not in the securing position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
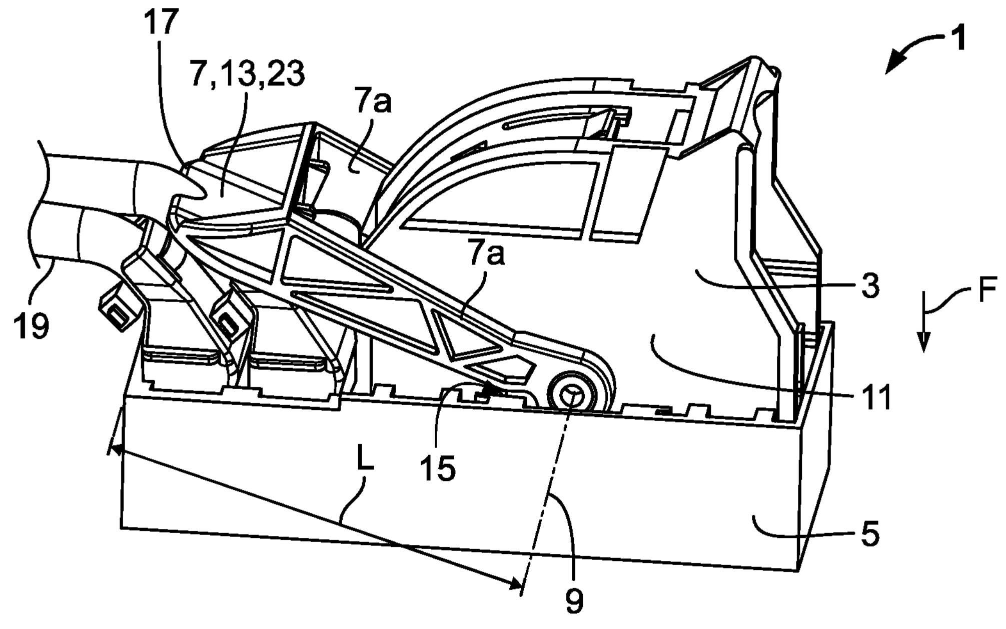
Fig. 1 (Prior Art)
FIG. 1 is a perspective view of a connector set from the prior art in a plug position.

Below, the invention will be described in more in detail with reference to drawings. In the drawings, embodiments of the invention are described which are mentioned merely by way of example. Technical features of the drawings can be arbitrarily combined with each other according to the invention. A redundant description of technical features is omitted in the drawings. Equal technical features and features having the same function are provided with the same reference numeral. If in this disclosure, the singular (plural) of features is mentioned, the plural (singular) of said technical features is not excluded.

Figure 2:
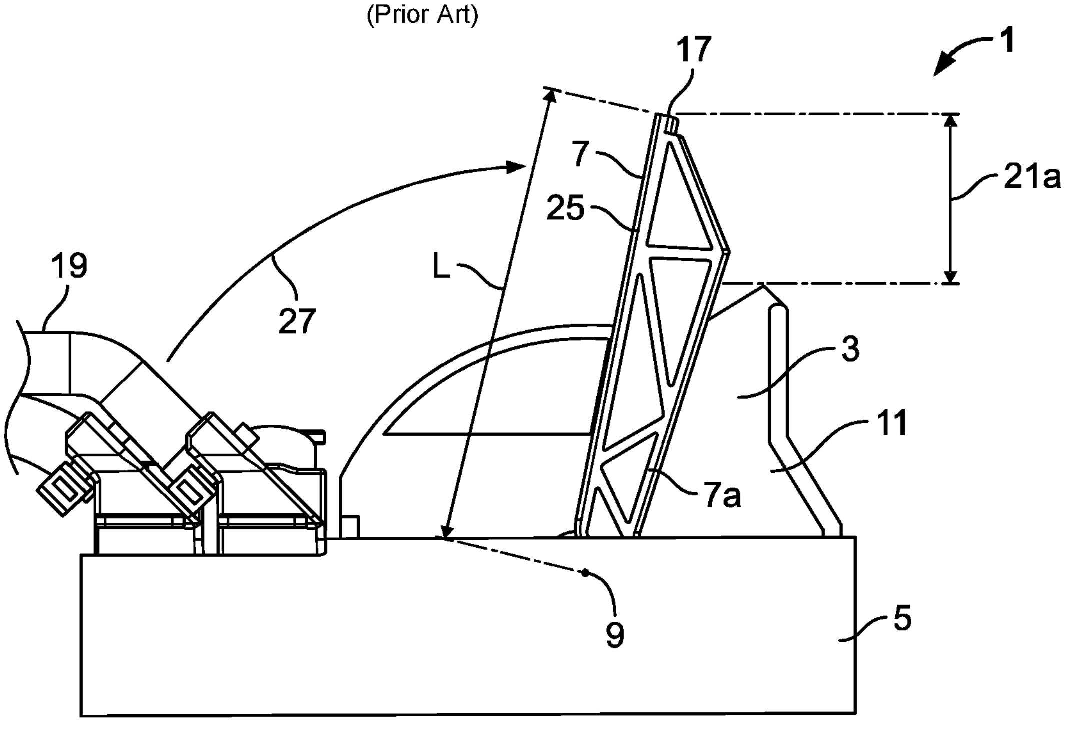
Fig. 2 (Prior Art)
FIG. 2 is a side view of the connector set of FIG. 1 in a securing position.

The connector set 1 with a plug connector 3 according to the prior art is shown in FIGS. 1 and 2. The connector set 1 according to the invention or the plug connector 3 according to the invention of the following FIGS. 3 to 11 can also include basic elements of this connector set 1 or plug connector 3 from prior art. A repeating description of technical features is therefore largely omitted in the drawings. If technical features in different drawings differ from each other as to their functions, this is explicitly described.

In the following drawings, a plug connector 3 according to the invention is shown which can, for example, also be plugged together with the counter connector 5 shown in FIG. 1 and FIG. 2 (cf. FIGS. 13 and 14). Basic elements, such as the connector housing 11, the lever arms 7*a*, the axis of rotation 9, and the coupling 15, are unchanged compared to previously shown embodiments.

The coupling 15 can be formed by a gearwheel or individual teeth of such a gearwheel. Equally, the coupling 15 can be formed by one single tooth, beam or the like extending away from the axis of rotation 9.

Figure 3:
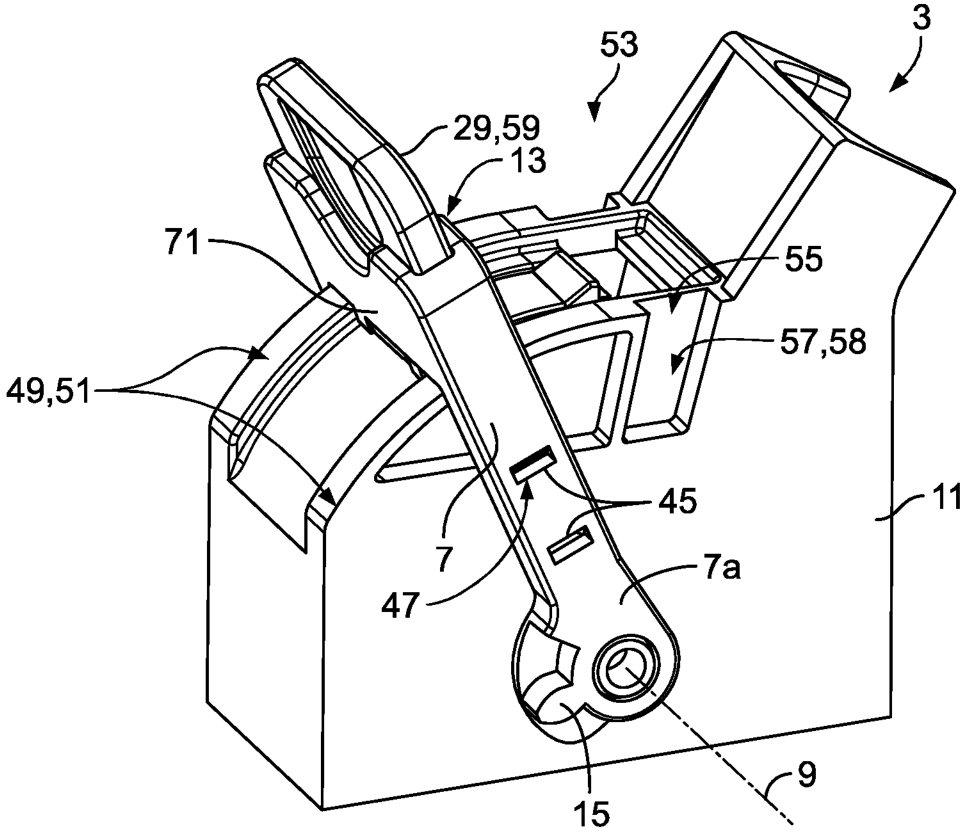
FIG. 3 is a perspective view of a plug connector according to an embodiment with a lever device in an intermediate position.

The plug connector 3 according to the invention, however, as shown in FIG. 3, includes a lever device 13 which comprises the lever 7 and a lever extension 29 attached to the lever 7 which can be extended and/or retracted with respect to the lever 7. The lever 7 can be U-shaped and the lever extension 29 can also be U-shaped. In other embodiments, the lever 7 could have the shape of a W, or more general, the shape of a comb, wherein such a lever 7 can be fastened to the axis of rotation 9 by each one of its teeth. The lever extension 29 can also have a corresponding shape.

Figure 4:
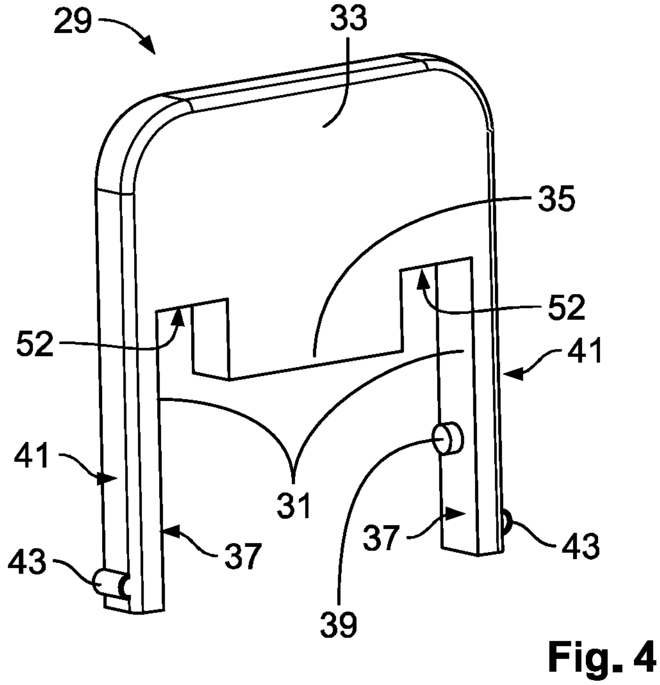
FIG. 4 is a perspective view of a lever extension of the plug connector.

The lever extension 29 is separately shown in FIG. 4. The lever extension 29 includes two arms 31 and one base 33. The base 33 also includes a latching region 35.

The embodiment of the lever extension 29 shown in FIG. 4 includes a guiding pin 39 on the inner side 37 of the arms 31. On an outer side 41 of the arms 31, latching elements 43 are provided. They have a semicircular cross-section only by way of example. Other cross-sections of the latching elements 43, for example in the form of a pyramid or a sawtooth, are also conceivable.

The lever extension 29 received in the lever 7 of the plug connector 3 of FIG. 3 corresponds to that of FIG. 4, however, without the guiding pin 39. To differentiate between them, this lever extension of the first embodiment is designated with reference numeral 29*a*. The lever extension 29 of FIG. 4 corresponds to the lever extension of the second embodiment which is designated with reference numeral 29*b*.

The latching elements 43 represent a loss prevention device 47 in connection with openings 45 in the lever arm 7*a* by which the lever extension 29 is captively held at the lever 7. The lever extension 29 is shiftably held at the lever 7 linearly radially towards the axis of rotation 9 of the lever device 13. The loss prevention device 47 can be releasable so that the lever extension 29 can be removed from the lever 7. Furthermore, the loss prevention device 47 can comprise several latching stages to latch the lever extension 29, for example, in a retracted state. This has the advantage that the lever extension 29 is secured in its retracted state and cannot release itself from it, i. e. not without the action of a force by the user.

The connector housing 11 includes two guiding members 49 which are embodied as sliding surface 51, as shown in FIG. 3. This guiding member 49 ensures that, when the lever 7 is moved out of the plug position 23 and is not in the securing position 25, a shifting of the lever extension 29 into the lever 7 is blocked. This is accomplished by two support surfaces 52 which are indicated in FIG. 4. If the lever 7 is neither in the plug position 23 nor in the securing position 25, the guiding member 49 represents a limit stop for the lever extension 29 which prevents the lever extension 29 from being retracted.

The guiding member 49 is interrupted in an upper region 53 of the connector housing 11. A pocket 57 follows this interruption 55. The guiding member 49 can pass over into the pocket 57. A pocket 57 can be understood as a recess in the connector housing 11. The guiding member 49 ends in the pocket 57 by or at the interruption 55. The pocket 57 can, in particular, be a radial pocket 58. In a radial pocket 58, the recess extends in the radial direction, away from the axis of rotation 9. The pocket 57 can be rectangular or cuboid. In an embodiment, two symmetric pockets 57 are provided at the connector housing 11. The pockets 57 can be arranged both symmetrically in themselves and symmetrically with respect to each other. The pocket 57 can conically expand away from the axis of rotation 9 of the lever 7, or taper towards the axis of rotation 9, respectively.

In FIG. 3, the lever extension 29 is in the extended state 59 and projects beyond the lever 7.

Figure 5:
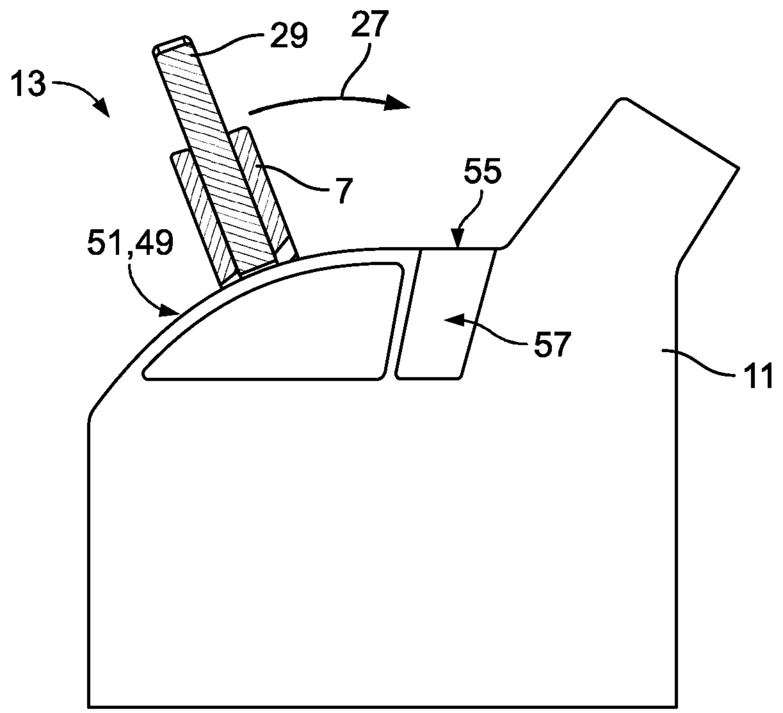
FIG. 5 is a schematic sectional side view of the plug connector of FIG. 3.
Figure 6:
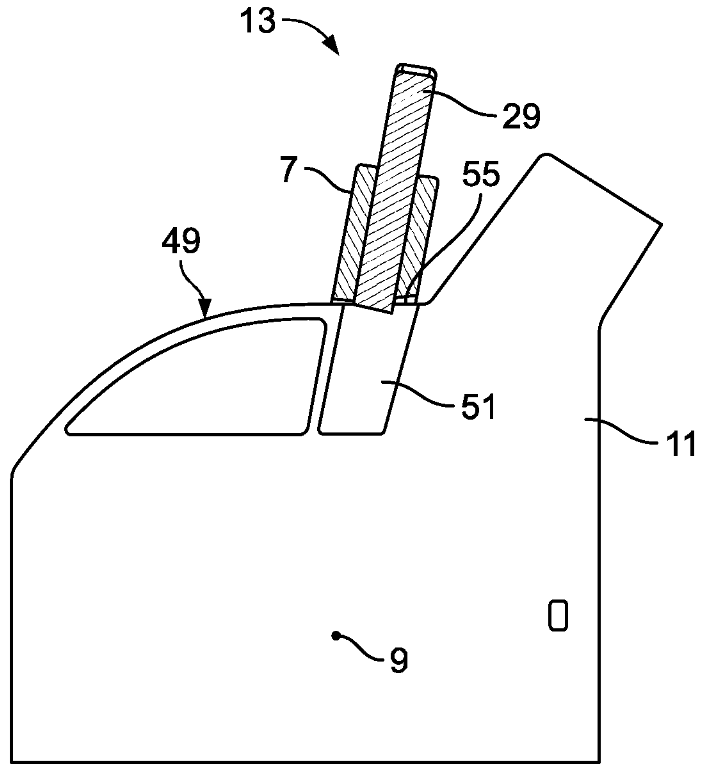
FIG. 6 is a schematic sectional side view of the plug connector of FIG. 3 in a securing position.
Figure 7:
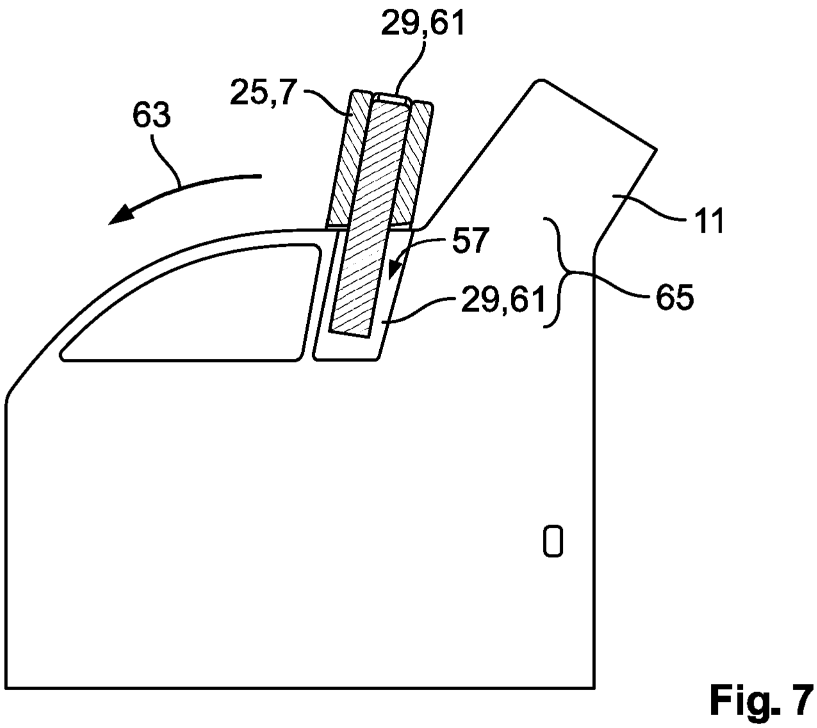
FIG. 7 is a schematic sectional side view of the plug connector of FIG. 6 with a retracted lever extension.

In FIGS. 5 to 7 described hereinafter, the plug connector 3 according to the invention is shown in a side view, wherein the lever arrangement 29 is cut in the region of a sidewall of the connector housing 11. The connector housing 11 is not cut, but the lever 7 and the lever extension 29 are. For a better overview, the axis of rotation 9 is not shown in all figures.

One can see in FIG. 5 that the lever extension 29 rests on the guiding member 49 and prevents a retraction of the lever extension 29 into the lever 7. This movement is blocked by the guiding member 49, i. e. the sliding surface 51. Furthermore, one can also see in this representation that in the region of the interruption 55, the guiding member 49 ends in the pocket 57.

If the lever device 13 is moved with the swivel movement 27, the lever extension 29 is no longer in contact with the guiding member 49 in the region of the interruption 55, as is shown in FIG. 6. By retracting the lever extension 29 towards the axis of rotation 9, the retracted state 61 of the lever extension 29 shown in FIG. 7 is reached. The swivel movement 27 of the lever 7 is completely independent of the linear movement of the lever extension 29 while it is being retracted or extended.

Figure 8:
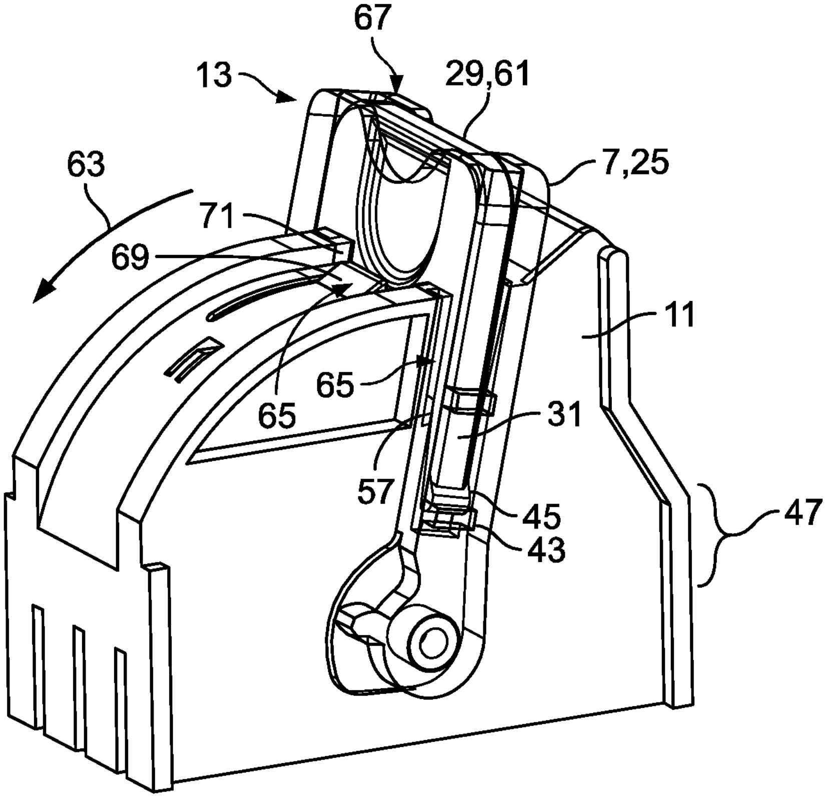
FIG. 8 is a perspective view of the plug connector of FIG. 7.

This retracted state 61 of the lever extension 29 is also shown in the perspective representation of the plug connector 3 according to the invention of FIG. 8. In the latter, the lever 7 is drawn in a semi-transparent manner for illustration purposes. In FIGS. 7 and 8, the lever 7 is in its securing position 25.

By the retracted lever extension 29, i. e. since the lever extension 29 is in its retracted state 61, a swivel movement 63 of the lever 7 out of the securing position 25 towards the plug position 23 (cf. FIG. 1 and FIG. 9) is blocked by a positive engagement 65 between the pocket 57 and the lever extension 29 in the retracted state 61.

In the retracted state 61, the lever extension 29 does not project beyond the lever 7 and is completely within its cubature 67. The lever extension 29 thus permits, in its extended state by a longer mechanical lever, to generate a higher plug force F with the same operating force, i. e. the force spent by the user, than without the lever extension 29.

Simultaneously, the structural size of the plug connector 3 can be reduced by retracting the lever extension 29. The lever 7 can have a mounting for the lever extension 29 accessible through a mounting opening and substantially completely enclose the lever extension 29.

In an embodiment, the lever extension 29 can be formed complementarily to the pocket 57 at least in sections. The pushing-in of the lever extension 29 into the pocket 57 is effected along a direction perpendicular to the swivel movement 63. Walls of the pocket 57 extending in the radial direction can thus serve as a limit stop for sections of the lever extension 29. These sections of the lever extension 29 can also be referred to as arms or legs of the lever extension 29. In an embodiment, the arms or legs of the lever extension 29 are received in the pocket 57 or the pockets 57 with a slight clearance.

One can furthermore see that the latching elements 43 of the arms 31 of the lever extension 29 are received in openings 45 of the lever 7 (only one of which can be seen in FIG. 8), which represent the loss prevention device 47. The connector housing 11 also includes a restraining or latching element 69. The latter blocks the lever 7 at a latching tongue 71 which is also shown in FIG. 3. The positive engagement 65 between the latching tongue 71 and the restraining or latching element 69 prevents the swivel movement 63.

Thus, the swivel movement 63 of the lever 7 in the securing position 25 is blocked on the one hand by the restraining or latching element 69 and the corresponding latching tongue 71, and on the other hand by the retracted lever extension 29. The swivel movement 27 (cf. FIG. 5) of the lever 7 is blocked by the connector housing 11 or also by the positive engagement 65 of the retracted lever extension 29 with the pocket 57. The latching can be only releasable upon the actuation of a release element or of the latching element 69. The restraining or latching element 69 of the connector housing 11 thus secures the lever 7 in the securing position and can be understood as a primary retention, whereas the retracted lever extension 29 can be understood as a secondary retention.

In FIGS. 9 to 13, another embodiment of the plug connector 3 according to the invention is shown. In this embodiment, the guiding member 49 comprises a link 73. In this link 73, a guiding pin 39 (cf. FIG. 4) is guided. In an embodiment, two guiding pins 39 are provided, one on each side of the connector housing 11, and two symmetrical links 73 are provided on the connector housing 11. These can be arranged oppositely at the connector housing 11 and each be accessible along a direction parallel to the axis of rotation 9 of the lever 7. A cross-section of the link 73 can be semicircular or rectangular, the link 73 being designed complimentarily to the guiding pin 39, which is guided in the link 73. The guiding member 49 can also be a sliding path or sliding surface formed at the outer side of the connector housing 11. The pocket 57 can be formed by an extension of the link 73, where this extension can extend substantially perpendicularly to the original direction of the link 73. The link 73 can also end in the pocket 57.

Figure 9:
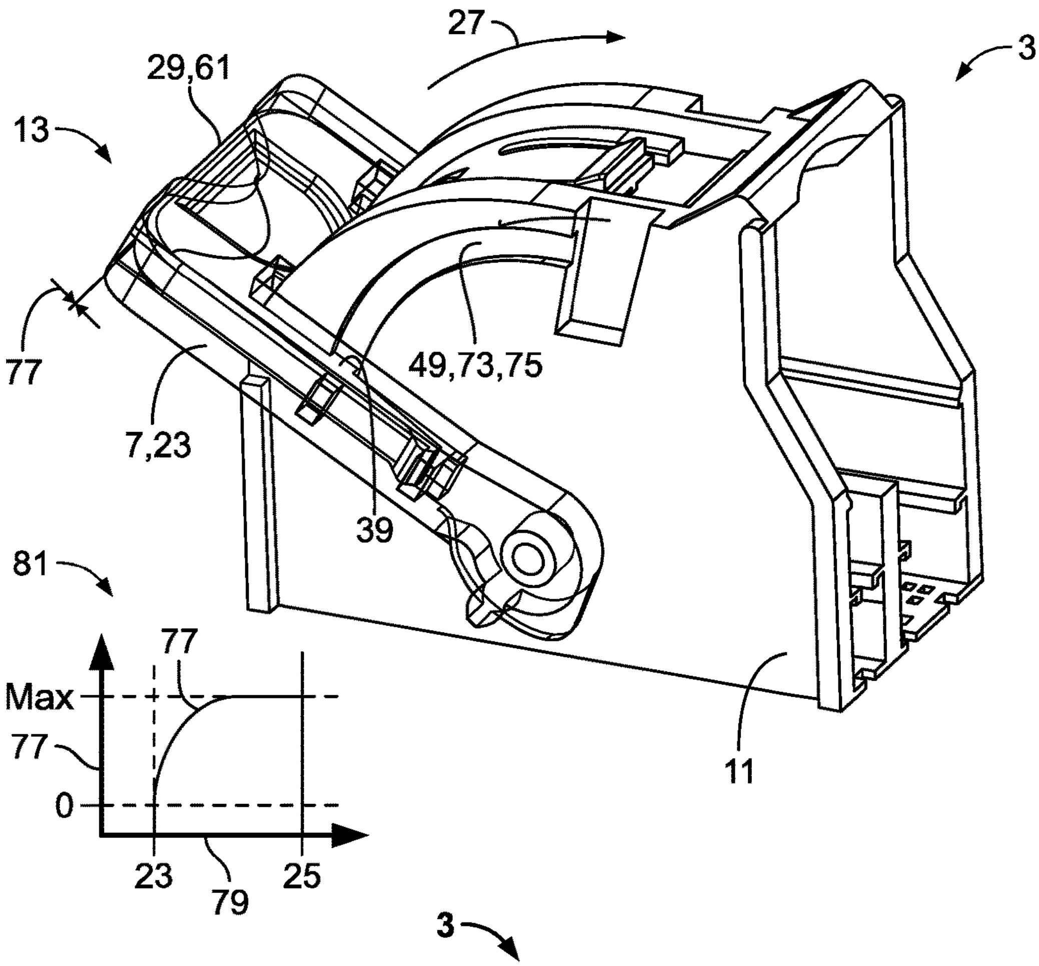
FIG. 9 is a perspective view of a plug connector according to another embodiment with the lever device in a plug position.

In FIG. 9, the lever extension 29 is received in the lever 7 in its retracted state 61, the lever 7 being in the plug position 23. This provides space advantages which will be described later with respect to FIG. 13. The link 73 represents a restraint guiding 75. By this restraint guiding 75, a stroke 77 by which the lever extension 29 is extended with respect to the lever 7 depends on an angular position 79 of the lever device 13. With such an unambiguous association between the angular position of the lever 7 and the stroke 77 by which the lever extension 29 is extended, a variable plug force adapted to the plug connector 3 geometry and the plug connector 3 type can be generated depending on the angular position of the lever 7 at a constant force which is transferred by the user to the lever 7.

Figure 11:
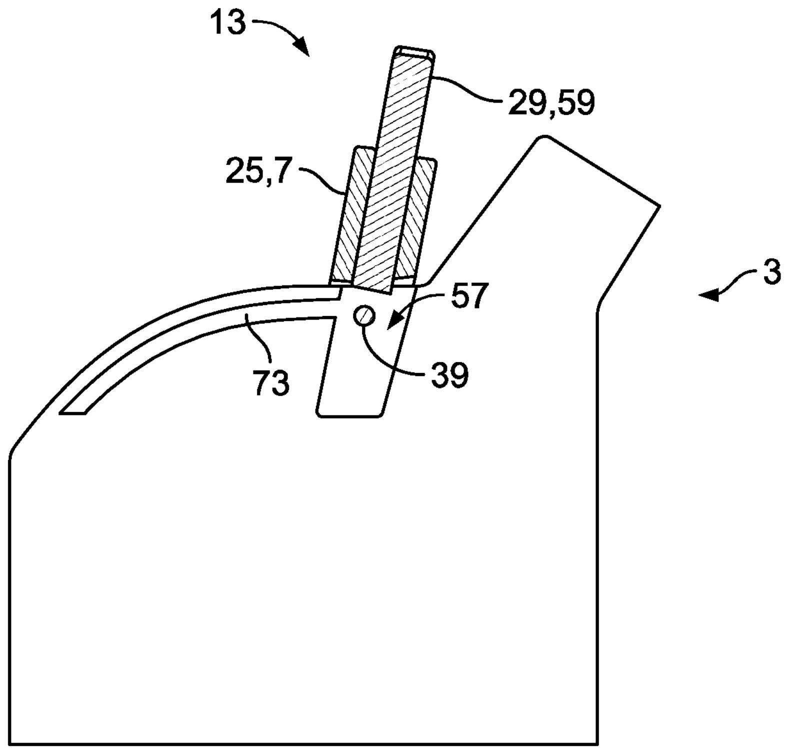
FIG. 11 is a schematic sectional side view of the plug connector of FIG. 10 with the lever device in a securing position.
Figure 12:
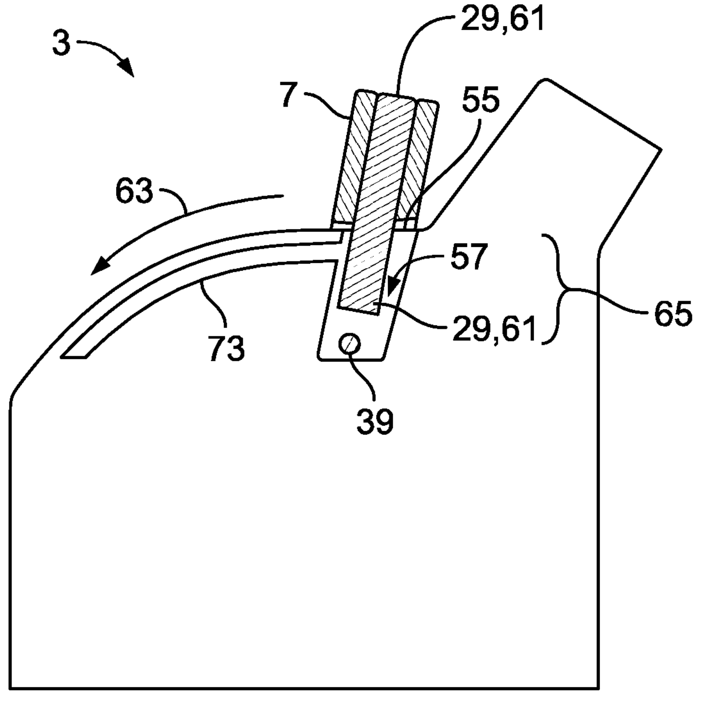
FIG. 12 is a schematic sectional side view of the plug connector of FIG. 11 with a retracted lever extension.

The angular position 79 of the lever device 13 can vary between the plug position 23 (FIG. 9) and the securing position 25 (FIGS. 11 and 12). A schematic dependence of the stroke 77 on the angular position 79 is shown in a diagram 81 not drawn to scale in FIG. 9. Starting from the plug position 23, the stroke 77 increases to a maximum value (marked by "max") and remains at this maximum value until the securing position 25 is reached. Since in the securing position 25, the lever extension 29 can be retracted into the pocket 57, in the securing position 25, both a stroke 77 of 0 (as is shown in FIG. 9) and a maximum stroke 77 are possible. The latter marks the extended state 59 of the lever extension 29. When the lever extension 29 is extended by the maximum stroke, the highest plug force can be reached.

Thus, merely by way of example, in a first phase of the plugging together of the plug connector 3 with the counter connector 5, a lower plug force is required than in a second phase. In the first phase, the connector housing 11 is plugged together with a counter connector housing which requires less force than the plugging together of a plurality of electric contacts in the second phase. To be able to spend the increasing required force with a constant force by the user, by the restraint guiding 75 of the lever extension 29, the latter is extended whereby the mechanical lever is extended and a higher plug force is permitted.

The increase of the stroke 77 can be linear or nonlinear, depending on the angle of rotation of the lever 7. Equally, a two-stage increase of the length of the mechanical lever (which is achieved by extending the lever extension 29) is possible, for example in a case where a first set of contact elements is to contact the corresponding counter contact elements before a second set of contact elements is contacted.

Figure 10:
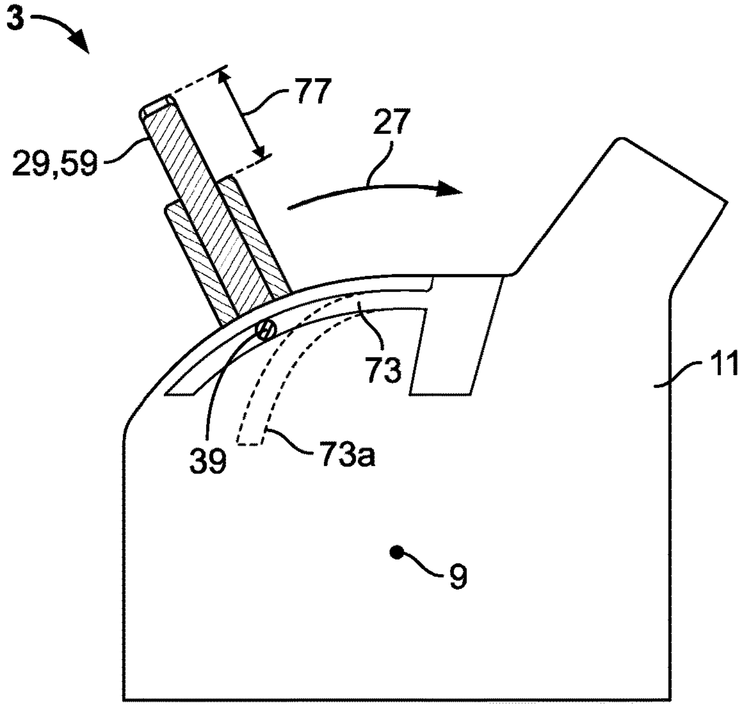
FIG. 10 is a schematic sectional side view of the plug connector of FIG. 9 with the lever device in an intermediate position.

Thus, in a swivel movement 27 of the lever 7 from the plug position 23 to the securing position 25, the lever extension 29 is extended. This is already the case in a position between the plug position 23 and the securing position 25 as is shown in FIG. 10, wherein the further swivel movement 27 is effected with the lever extension 29 in its extended state 59.

The guiding member 49 can be designed as a restraint guiding by which the lever extension 29 is shifted with respect to the lever 7 along a swivel movement 28. The position of the lever extension 29 compared to the lever 7, i.e. whether and to what extent it is retracted or extended, can thus not be freely adjusted by the user but is predetermined by the guiding member 49. An operating error originating from the lever extension 29 is thus nearly excluded.

Finally, the lever arrangement 13 or the lever 7, respectively, reaches the securing position 25, wherein the lever extension 29 is still in its extended state 59. This is shown in FIG. 11. In this position, the guiding pin 39, however, is no longer blocked by the link 73 since the latter is interrupted at the pocket 57.

As is shown in FIG. 12, the interruption 55, where the pocket 57 is adjacent to the link 73, permits to transfer the lever extension 29 to the retracted state 61, wherein at least some sections of the lever extension 29 are here received in the pocket 57. In the second embodiment of the plug connector 3 according to the invention, too, thus a positive engagement 65 between the pocket 57 and the lever extension 29 in its retracted state 61 which blocks a swivel movement 63 is created.

It should be pointed out that the embodiment of the link 73 shown in FIGS. 10 to 12 differs from the link 73 of FIG. 9. In FIG. 10, the link 73 of FIG. 9 is schematically shown in a dotted line and designated with reference numeral 73*a*.

In an embodiment, the lever extension 29 can be a housing retention which can only be transferred to its retracted state with a correct plug connection between the plug connector 3 and the counter connector 5. Such a lever extension 29 can thus represent a CPA (contact positioning assurance).

Figure 13:
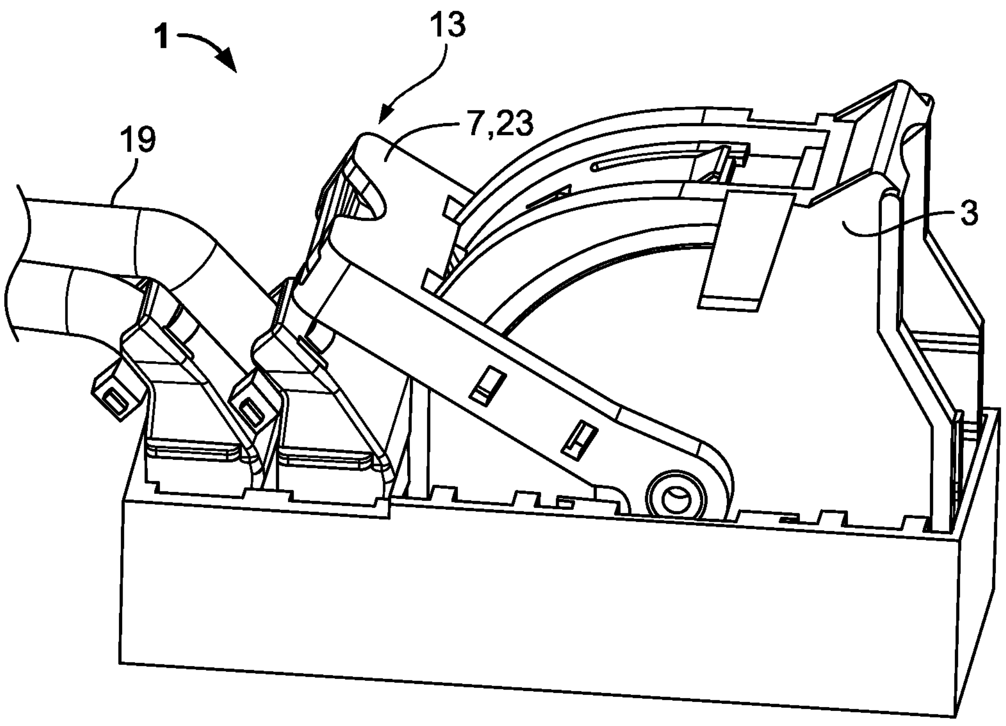
FIG. 13 is a perspective view of a connector set with the plug connector according to an embodiment.
Figure 14:
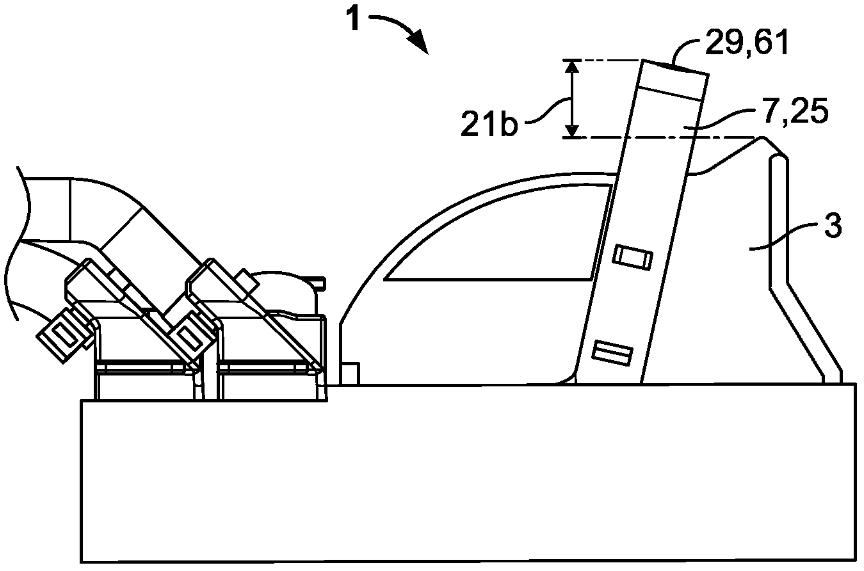
FIG. 14 is a side view of the connector set with the plug connector.

In FIGS. 13 and 14, the two exemplary embodiments of the plug connector 3 according to the invention are shown in a corresponding connector set 1 according to the invention. These figures are to illustrate the advantages over the solutions from prior art which are shown in FIGS. 1 and 2. In the plug position 23 of the lever 7 of FIG. 13, at the end 17 of the lever arrangement 13, the connector set 1 according to the invention does not contact the feed cables 19 which increases operability.

A further advantage of the connector set 1 according to the invention is shown in FIG. 14 in which the lever 7 is in its securing position 25, and the lever extension 29 (concealed by the lever 7) is in its retracted state 61. A projection 21*b* that can be achieved with the solution according to the invention is clearly smaller than the projection 21*a* of the solution from prior art (FIG. 2), so that a smaller installation space is required.

The plug connector 3 according to the invention and the connector set 1 according to the invention have the advantage that, by the lever extension 29, the force F a user has to spend for plugging together can be reduced, wherein the plug connector 3 or the connector set 1, respectively, do not increase the structural size of the plug connector 3 in a retracted state 61. The plug connector 3 according to the invention and the connector set 1 according to the invention thus have an improved operability with a reduced size.

What is claimed is:

1. A plug connector pluggable together with a counter connector, comprising:

a connector housing having a guiding member; and a lever device having a lever transferrable from a plug position to a securing position, a coupling that is movable by the lever to engage the counter connector, and a lever extension attached to the lever and extendable and/or retractable with respect to the lever, a swivel movement of the lever out of the securing position is blocked by the lever extension retracted with respect to the lever, the guiding member blocks a shifting of the lever extension if the lever is moved out of the plug position and is not in the securing position, the guiding member is a restraint guiding by which the lever extension is shifted with respect to the lever along the swivel movement.

2. The plug connector of claim 1, wherein the guiding member has a link formed as a slot at the connector housing, the lever extension is guided in the link.

3. The plug connector of claim 1, wherein the connector housing has a pocket in which the lever extension is received in a retracted state.

4. The plug connector of claim 3, wherein the guiding member ends in the pocket.

5. The plug connector of claim 3, wherein the lever extension is inserted into the pocket in the securing position.

6. The plug connector of claim 3, wherein the lever extension has a pair of legs and the connector housing has a pair of pockets opposite one another, the legs are inserted into the pockets in the securing position.

7. The plug connector of claim 1, wherein the lever extension does not project beyond the lever when retracted.

8. The plug connector of claim 1, wherein a stroke by which the lever extension is extended with respect to the lever depends on an angular position of the lever device.

9. The plug connector of claim 8, wherein the stoke increases during a transfer of the lever device from the plug position to the securing position.

10. The plug connector of claim 1, wherein the lever extension is held at the lever in a manner shiftable linearly towards an axis of rotation of the lever device.

11. The plug connector of claim 1, wherein the lever extension has a loss prevention device by which the lever extension is held captive at the lever.

12. The plug connector of claim 1, wherein the connector housing has a restraining or latching element by which a swivel movement of the lever in the securing position out of the securing position is restrained or blocked.

13. A connector set, comprising:

a plug connector including a connector housing having a guiding member and a lever device having a lever transferrable from a plug position to a securing position, a coupling that is movable by the lever, and a lever extension attached to the lever and extendable and/or retractable with respect to the lever, a swivel movement of the lever out of the securing position is blocked by the lever extension retracted with respect to the lever, the guiding member blocks a shifting of the lever extension if the lever is moved out of the plug position and is not in the securing position, the guiding member is a restraint guiding by which the lever extension is shifted with respect to the lever along the swivel movement; and a counter connector engaging the coupling of the plug connector.

14. The connector set of claim 13, wherein the lever extension is a housing retention that is only transferred to a retracted state with a correct plug connection between the plug connector and the counter connector.

15. A plug connector pluggable together with a counter connector, comprising:

a connector housing having a guiding member; and a lever device having a lever transferrable from a plug position to a securing position, a coupling that is movable by the lever to engage the counter connector, and a lever extension attached to the lever and extendable and/or retractable with respect to the lever, a swivel movement of the lever out of the securing position is blocked by the lever extension retracted with respect to the lever, the guiding member blocks a shifting of the lever extension if the lever is moved out of the plug position and is not in the securing position, the guiding member has a link formed as a slot at the connector housing, the lever extension is guided in the link.

16. A plug connector pluggable together with a counter connector, comprising:

a connector housing having a guiding member; and a lever device having a lever transferrable from a plug position to a securing position, a coupling that is movable by the lever to engage the counter connector, and a lever extension attached to the lever and extendable and/or retractable with respect to the lever, a swivel movement of the lever out of the securing position is blocked by the lever extension retracted with respect to the lever, the guiding member blocks a shifting of the lever extension if the lever is moved out of the plug position and is not in the securing position, a stroke by which the lever extension is extended with respect to the lever depends on an angular position of the lever device.

17. The plug connector of claim 16, wherein the stoke increases during a transfer of the lever device from the plug position to the securing position.

* * * * *